(12) United States Patent
Kim et al.

(10) Patent No.: US 11,355,818 B2
(45) Date of Patent: Jun. 7, 2022

(54) APPARATUS AND METHOD FOR MANUFACTURING ELECTRODE ASSEMBLY

(71) Applicant: LG Chem, Ltd., Seoul (KR)

(72) Inventors: Tae Kyu Kim, Daejeon (KR); Cha Hun Ku, Daejeon (KR); Jung Kwan Pyo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 66 days.

(21) Appl. No.: 16/466,144

(22) PCT Filed: Apr. 17, 2018

(86) PCT No.: PCT/KR2018/004447
§ 371 (c)(1),
(2) Date: Jun. 3, 2019

(87) PCT Pub. No.: WO2018/212466
PCT Pub. Date: Nov. 22, 2018

(65) Prior Publication Data
US 2020/0067050 A1    Feb. 27, 2020

(30) Foreign Application Priority Data
May 18, 2017    (KR) .......................... 10-2017-0061893

(51) Int. Cl.
*H01M 4/04* (2006.01)
*H01M 50/46* (2021.01)
*H01M 4/62* (2006.01)

(52) U.S. Cl.
CPC ....... *H01M 50/461* (2021.01); *H01M 4/0435* (2013.01); *H01M 4/621* (2013.01); *H01M 2300/0051* (2013.01)

(58) Field of Classification Search
CPC ............. H01M 10/04; H01M 10/0585; H01M 2300/0051; H01M 4/0435; H01M 4/621; H01M 50/461; Y02E 60/10
See application file for complete search history.

(56) References Cited

U.S. PATENT DOCUMENTS

| | | |
|---|---|---|
| 5,778,515 A | 7/1998 | Menon |
| 6,413,667 B1 | 7/2002 | Gozdz |

(Continued)

FOREIGN PATENT DOCUMENTS

| | | |
|---|---|---|
| CN | 1419718 A | 5/2003 |
| CN | 103238248 A | 8/2013 |

(Continued)

OTHER PUBLICATIONS

Machine Translation JPH06256947(A) (Year: 1994).*
Extended European Search Report for Application No. 18803140.5 dated Feb. 4, 2020.

*Primary Examiner* — Victoria H Lynch
(74) *Attorney, Agent, or Firm* — Birch, Stewart, Kolasch & Birch, LLP

(57) ABSTRACT

The present invention relates to an apparatus and method for manufacturing an electrode assembly. The method for manufacturing the electrode assembly comprises a melting induction process of inducing melting on an outer surface of a separator by a melting induction solvent to increase an adhesion force of an interface between an electrode and the separator and a lamination process of alternately combining and laminating the electrode and the separator, wherein the melting induction process comprises a vaporization process of vaporizing the melting induction solvent to form a space that is humidified by vapor, and the electrode and the separator are disposed in the space that is humidified by the vapor to induce the uniform melting on the outer surface of the separator.

13 Claims, 4 Drawing Sheets

(56) References Cited

U.S. PATENT DOCUMENTS

| | | |
|---|---|---|
| 6,692,543 B1 | 2/2004 | Hamano et al. |
| 7,279,251 B1 | 10/2007 | Yun et al. |
| 2003/0194607 A1 | 10/2003 | Huang |
| 2005/0260490 A1 | 11/2005 | Persi et al. |
| 2009/0111025 A1* | 4/2009 | Lee ............... H01M 50/449 429/251 |
| 2009/0176151 A1* | 7/2009 | Kim ............... H01M 4/366 429/129 |
| 2009/0325057 A1* | 12/2009 | Kim ............... H01M 50/446 429/131 |
| 2011/0274980 A1 | 11/2011 | Lunt et al. |
| 2013/0260211 A1 | 10/2013 | Min et al. |

FOREIGN PATENT DOCUMENTS

| | | |
|---|---|---|
| JP | H05-006775 A | 1/1993 |
| JP | H06256947 A | 9/1994 |
| JP | 3123780 B2 | 1/2001 |
| JP | 3474853 B2 | 12/2003 |
| JP | 2009-9919 A | 1/2009 |
| JP | 4915025 B2 | 4/2012 |
| JP | 2016-007748 A | 1/2016 |
| JP | 2016-207393 A | 12/2016 |
| KR | 10-2001-0024717 A | 3/2001 |
| KR | 10-2003-0007633 A | 1/2003 |
| KR | 10-1520139 B1 | 5/2015 |
| KR | 10-2016-0010121 A | 1/2016 |
| KR | 10-2017-0037556 A | 4/2017 |

\* cited by examiner

APPARATUS AND METHOD FOR MANUFACTURING ELECTRODE ASSEMBLY

CROSS-REFERENCES TO RELATED APPLICATIONS

This application is a U.S. national phase application, pursuant to 35 U.S.C. § 371, of PCT/KR2018/004447, filed Apr. 17, 2018, designating the United States, which claims priority to Korean Application No. 10-2017-0061893, filed May 18, 2017. The entire contents of the aforementioned patent applications are incorporated herein by this reference.

TECHNICAL FIELD

The present invention relates to an apparatus and method for manufacturing an electrode assembly.

BACKGROUND ART

Secondary batteries are rechargeable unlike primarily batteries, and also, the possibility of implementing in a compact size and a high capacity is high. Thus, recently, many studies on secondary batteries are being carried out. As technology development and demands for mobile devices increase, the demands for secondary batteries as energy sources are rapidly increasing.

Secondary batteries are classified into coin type batteries, cylindrical type batteries, prismatic type batteries, and pouch type batteries depending on a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as a form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

In the related art, lamination is performed at a high temperature to enhance the adhesion force between the electrode and the separator. However, damages such as shrinkage of the separator due to the high temperature occur, which increase cell resistance.

DISCLOSURE OF THE INVENTION

Technical Problem

An aspect of the present invention is to provide an apparatus and method for manufacturing an electrode assembly, in which an adhesion force between an electrode and a separator is increased while preventing the separator from being damaged.

Another aspect of the present invention is to provide an apparatus and method for manufacturing an electrode assembly, in which an adhesion force on an interface between an electrode and a separator is uniformly increased.

Technical Solution

A method for manufacturing an electrode assembly according to an embodiment of the present invention comprises a melting induction process of inducing melting on an outer surface of a separator by a melting induction solvent to increase an adhesion force of an interface between an electrode and the separator, and a lamination process of alternately combining and laminating the electrode and the separator, wherein the melting induction process comprises a vaporization process of vaporizing the melting induction solvent to form a space that is humidified by vapor, and the electrode and the separator are disposed in the space that is humidified by the vapor to induce the uniform melting on the outer surface of the separator.

An apparatus for manufacturing an electrode assembly according to an embodiment of the present invention comprises a chamber comprising an accommodation part that accommodates an electrode assembly, in which electrodes and separators are alternately disposed, and a melting induction solvent that induces melting on an outer surface of each of the separators to increase an adhesion force of an interface between each of the electrodes and the separators, and a heater that vaporizes the melting induction solvent accommodated in the chamber to induce uniform melting on the outer surface of the separator disposed in the accommodation part of the chamber.

Advantageous Effects

According to the present invention, a melting induction solvent may be used to increase an adhesion force on the interface between the electrode and the separator. In more detail, di-methyl carbonate (DMC) may be used as the melting induction solvent to induce the melding on the outer surface of the separator so that the lamination of the electrode and the separator are enabled at low temperature. In other words, the adhesion force between the electrode and the separator may be increased while preventing the separator from being damaged by the high-temperature lamination.

In addition, according to the present invention, the electrode and the separator may pass through a space, which is humidified by vapor of the melting induction solvent to uniformly melt the outer surface of the separator. Thus, the adhesion force on the interface between the electrode and the separator may uniformly increase.

BEST MODE FOR CARRYING OUT THE INVENTION

Figure 1:
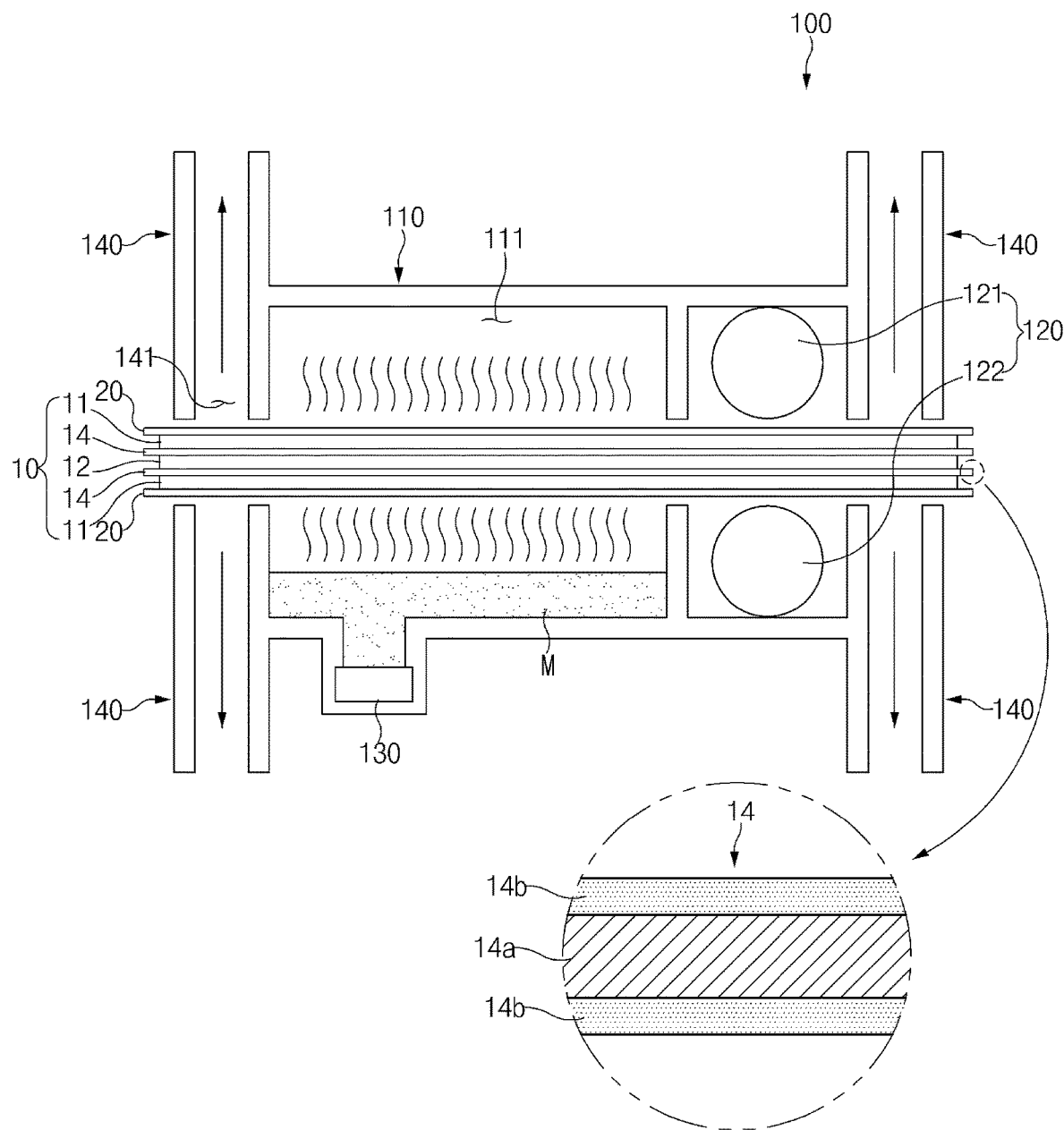
FIG. 1 is a cross-sectional view illustrating an apparatus and method for manufacturing an electrode assembly according to an embodiment of the present invention.

A method for manufacturing an electrode assembly according to an embodiment of the present invention comprises a melting induction process of inducing melting on an outer surface of a separator by a melting induction solvent to increase an adhesion force on an interface between an electrode and the separator, and a lamination process of alternately combining and laminating the electrode and the separator, wherein the melting induction process comprises a vaporization process of vaporizing the melting induction solvent to form a space that is humidified by the vapor, and the electrode and the separator are disposed in the space that is humidified by the vapor to induce the uniform melting on the outer surface of the separator.

Further, an apparatus for manufacturing an electrode assembly according to an embodiment of the present invention comprises a chamber comprising an accommodation part that accommodates an electrode assembly, in which electrodes and separators are alternately disposed, and a melting induction solvent that induces melting on an outer surface of each of the separators to increase an adhesion force on an interface between each of the electrodes and the separator, and a heater that vaporizes the melting induction solvent accommodated in the camber to induce uniform melting on the outer surface of the separator disposed in the accommodation part of the chamber.

Mode for Carrying Out the Invention

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
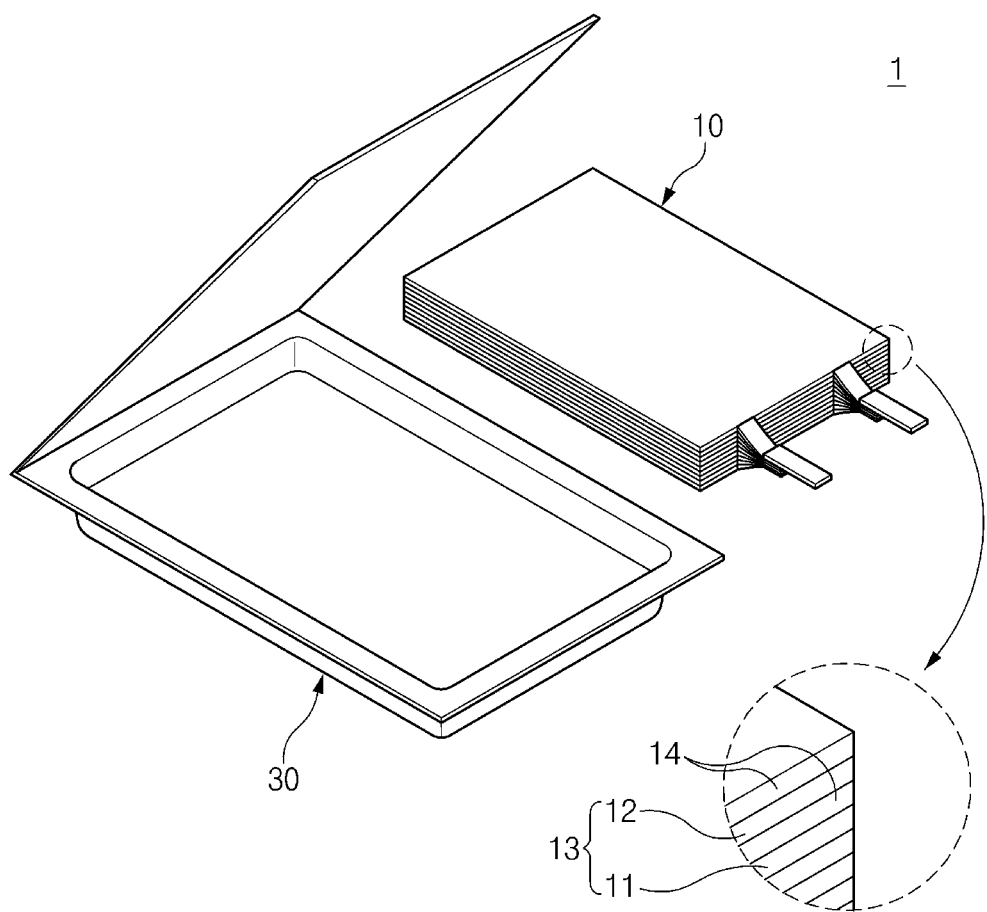
FIG. 2 is an exploded perspective view of a secondary battery comprising the electrode assembly manufactured through the apparatus and method for manufacturing the electrode assembly according to an embodiment of the present invention.

FIG. 1 is a cross-sectional view illustrating an apparatus and method for manufacturing an electrode assembly according to an embodiment of the present invention, and FIG. 2 is an exploded perspective view of a secondary battery comprising the electrode assembly manufactured through the apparatus and method for manufacturing the electrode assembly according to an embodiment of the present invention.

Referring to FIG. 1, a method for manufacturing an electrode assembly according to an embodiment of the present invention comprises a melting induction process of inducing melting on outer surfaces of separators 14 and a lamination process of alternately combining and laminating electrodes 13 and the separators 14 to manufacture an electrode assembly 10. Here, referring to FIG. 2, the electrode assembly 10 may be a chargeable/dischargeable power generation element, in which the electrodes 13 and the separators 14 are alternately laminated, and be accommodated in a battery case 30 to constitute a secondary battery 1.

Hereinafter, the method for manufacturing the electrode assembly according to a first embodiment of the present invention will be described in more detail with reference to FIGS. 1 to 3.

Referring to FIGS. 1 and 2, in the melting induction process, the melting on the outer surface of each of the separators 14 is induced through a melting induction solvent M to increase an adhesion force on an interface between each of the electrodes 13 and each of the separators 14.

Here, the electrodes 13 and the separators 14 may be alternately disposed. Here, each of the electrodes 13 comprises a positive electrode 11 and a negative electrode 12. Here, the positive electrode 11, the separator 14, and the negative electrode 12 may be alternately disposed.

The positive electrode 11 may comprise a positive electrode current collector (not shown) and a positive electrode active material (not shown) applied to the positive electrode current collector, and the negative electrode 12 may comprise a negative electrode current collector (not shown) and a negative electrode active material (not shown) applied to the negative electrode current collector.

For example, the positive electrode current collector may be provided as foil made of an aluminum (Al) material.

The positive electrode active material may comprise lithium manganese oxide, lithium cobalt oxide, lithium nickel oxide, lithium iron phosphate, or a compound containing at least one of these and mixtures thereof.

For another example, the positive electrode active material may comprise a Hi Ni-based positive electrode material. Here, the Hi Ni-based positive electrode material may comprise at least one of a LiNiMnCoO-based material, a LiNiCoAl-based material, or a LiMiMnCoAl-based material.

For example, the negative electrode current collector may be provided as foil made of a copper (Cu) or nickel (Ni) material.

For example, the negative electrode active material may be made of a material comprising a synthetic graphite.

For another example, the negative electrode active material may comprise a lithium metal, a lithium alloy, carbon, petroleum coke, activated carbon, graphite, a silicon compound, a tin compound, a titanium compound, or an alloy thereof.

The separator 14 is made of an insulation material to electrically insulate the positive electrode 11 from the negative electrode 12.

Also, the separator 14 may comprise a base material 14a and a melting layer 14b formed on an outer surface of the base material 14a. Here, the melting layer 14b may comprise an organic material. The organic material may be melted through the melting induction solvent M. In particular, the melting induction solvent M may not melt the base material 14a but melt only the organic material of the melting layer 14b to soften the melting layer 14b.

For example, the base material 14a may be made of a polyolefin-based resin film such as polyethylene or polypropylene having micropores. Here, the base material 14a is resinized as a high molecular polymer and is not melted in the melting induction solvent M. The base material 14a may be formed in the form of a film.

The melting layer 14b may comprise an inorganic material and an organic material. Here, the organic material may comprise a binder and a dispersing agent. Each of the binder and the dispersing agent may comprise a monomolecular organic material and be melted in the melting induction solvent M.

Further, the melting layer 14b may comprise, for example, 80 wt % to 90 wt % of the inorganic material, 9 wt % to 18 wt % of the binder, and 1 wt % to 2 wt % of the dispersing agent.

The inorganic material may be made of, for example, aluminum oxide.

The binder may comprise, for example, polyvinylidene fluoride copolymer (PVdF).

The dispersing agent may comprise, for example, cyanoethyl polyvinyl alcohol (PVA).

In addition, the melting induction process may further comprise a vaporization process of vaporizing the melting induction solvent M to form a space, which is humidified by vapor. Here, the electrode 13 and the separator 14 may be disposed in the space, which is humidified by the vapor through the vaporization process, to induce the uniform melting on the separator 14. In particular, the separator 14 may be disposed in the space, which is humidified by the vapor, to uniformly induce melting on the surface of the separator 14 that faces the electrode 13 due to the melting induction solvent M. Thus, an adhesion force between the electrode 13 and the separator 14 may become uniform.

In the vaporization process, the melting induction solvent M accommodated in an accommodation part 111 formed in a chamber 110 may be vaporized. Here, since the melting induction solvent M is vaporized, the space which is humidified by the vapor, may be formed in the accommodation part 111 of the chamber 110. Thus, the electrode 13 and the separator 14 may be disposed in the accommodation part 111 of the chamber 110 to induce the melting of the separator 14.

Furthermore, in the vaporization process, the melting induction solvent M accommodated in the accommodation part 111 of the chamber 110 may be heated by a heater 130 and thus be vaporized. Here, the melting induction solvent M may be accommodated in a lower portion of the accommodation part 111 of the chamber 110, and the heater 130 may be disposed at a lower portion of the chamber 110 to vaporize the melting induction solvent M. Here, the heater 130 may comprise, for example, a heater case (not shown) and a coil (not shown) wound within the heater case to heat the melting induction solvent M using resistive heating of the coil.

In the melting induction process, a solvent having affinity for the organic material of the melting layer 14b may be used as the melting induction solvent M. Here, a di-methyl carbonate (DMC) solvent may be used as the melting induction solvent M. In the vaporization process, the DMC solvent may be heated at a temperature of 80° C. to 90° C. by the heater 130 and thus be vaporized.

As a result, the vaporized DMC solvent may melt the organic material contained in the melting layer 14b of the separator 14 to induce the uniform melting on the outer surface of the separator 14. Thus, the adhesion force on the interface between the electrode 13 and the separator 14 may become uniform and increase.

In the melting induction process, the separator 14 may be melted while the electrode 13 and the separator 14 pass through the accommodation part 111 of the chamber 110.

Here, a vacuum hood 140 may be provided at both sides of the chamber 110 in a traveling direction of the electrode 13 and the separator 14 to suction the vaporized DMC solvent that leaks to the outside of the accommodation part 111 of the chamber 110 through a vacuum hole 141 of the vacuum hood 140. Thus, the DMC solvent that is harmful to human body may be prevented from leaking to the outside of the chamber 110.

Referring to FIGS. 1 and 2, in the lamination process, the electrodes 13 and the separators 14 may be alternately combined and laminated through a lamination part 120 comprising a pair of rolls 121 and 122.

The lamination process may be performed in the accommodation part 111 of the chamber 110.

Furthermore, in the lamination process, since the electrode 13 and the separator 14 are pressed while passing between the pair of rolls 121 and 122, the electrode 13 and the separator 14 may be combined and laminated. Here, the outer surface of the separator 14, which is melted by the melting induction solvent M, and an adhesion surface of the electrode 13 may adhere to each other. The outer surface of the separator 14 that faces the electrode 13 may be uniformly melted by the melting induction solvent M. Thus, the separator 14 and the electrode 13 may uniformly adhere to each other with a strong adhesion force through the pair of rolls 121 and 122 without applying a high temperature heat. Thus, the separator 14 may be prevented from being damaged by the high temperature, and the electrode assembly 10 may be prevented from increasing in resistance due to the damage of the separator 14.

Here, the pair of rolls 121 and 122 may comprise, for example, an upper roll 121 and a lower roll 122, which are respectively disposed above and below the electrode 13 and the separator 14.

In the lamination process, polyethylene terephthalate (PET) 20 may be disposed on the outermost surface of the electrodes 13 and the separators 14, which are alternately disposed. In particular, the PET 20 may be disposed on each of both surfaces of the electrode assembly 10 comprising the electrode 13 and the separator 14. Subsequently, the pair of rolls 121 and 122 may press the PET 20 to press the electrode assembly 10, thereby preventing the electrode assembly 10 from being damaged during the lamination process.

Also, in the lamination process, for example, the pair of rolls 121 and 122 may be maintained at a temperature of 0° C. to 100° C. Here, in the lamination process, for specific example, the pair rolls 121 and 122 may be maintained at a temperature of 45° C. to 90° C. to press the electrode 13 and the separator 14. Here, for more specific example, the pair rolls 121 and 122 may be maintained at a temperature of 50° C. to press the electrode 130 and the separator 14.

Figure 3:
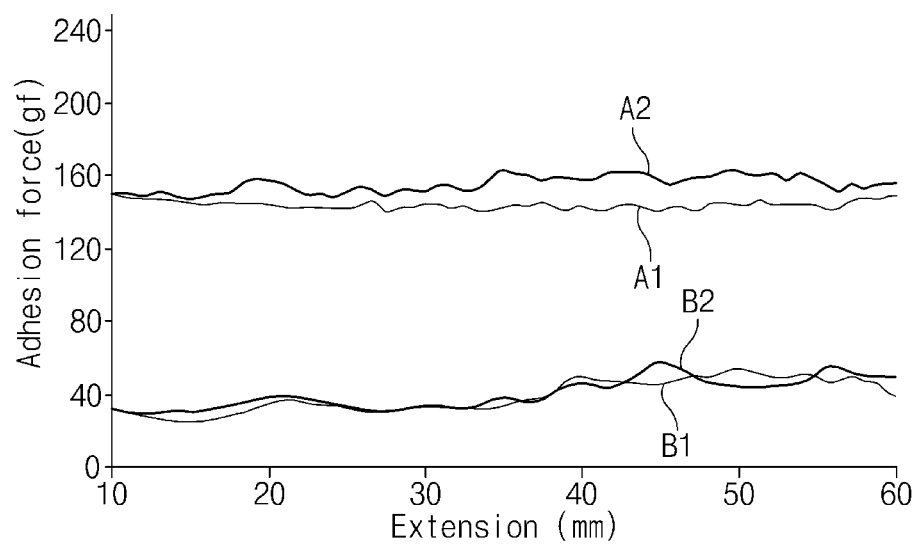
FIG. 3 is a graph illustrating results obtained by comparing the adhesion force of the electrode assembly manufactured through the apparatus and method for manufacturing the electrode assembly according to an embodiment of the present invention with the adhesion force of the electrode assembly according to the related art.

FIG. 3 is a graph illustrating results obtained by comparing the adhesion force of the electrode assembly manufactured with the apparatus and method for manufacturing the electrode assembly according to an embodiment of the present invention with the adhesion force of the electrode assembly according to the related art. Here, in FIG. 3, a vertical axis represents adhesion force between the electrode 13 and the separator 14, and a horizontal axis represents a measurement section.

As illustrated in FIG. 3, it is seen that the adhesion force between an electrode 13 and a separator 14 in electrode assemblies A1 and A2, which are manufactured through the method for manufacturing the electrode assembly according to an embodiment of the present invention is more uniform compared to the adhesion force in electrode assemblies B1 and B2 according to the related art.

In more detail, the adhesion force between the electrode 13 and the separator 14 in the electrode assemblies A1 and A2, which are manufactured through the method for manufacturing the electrode assembly according to an embodiment of the present invention has a mean value of 143.9 gf to 155.0 gf, and the adhesion force in the electrode assemblies B1 and B2 according to the related art has a mean value of 39.9 gf to 41.5 gf. Thus, it is seen that the adhesion force in the electrode assemblies A1 and A2, which are manufactured through the method for manufacturing the electrode assembly according to an embodiment of the present invention is significantly higher compared to the adhesion force in the electrode assemblies B1 and B2 according to the related art.

Furthermore, the adhesion force between the electrode 13 and the separator 14 in the electrode assemblies A1 and A2, which are manufactured through the method for manufacturing the electrode assembly according to an embodiment of the present invention has a deviation of 3.2 gf to 4.8 gf, and the adhesion force in the electrode assemblies B1 and B2 according to the related art has a deviation of 8.6 gf to 9.3 gf. Thus, it is seen that the adhesion force in the electrode assemblies A1 and A2, which are manufactured through the method for manufacturing the electrode assembly according to an embodiment of the present invention is significantly more uniform compared to the adhesion force in the electrode assemblies B1 and B2 according to the related art (see FIG. 1).

Figure 4:
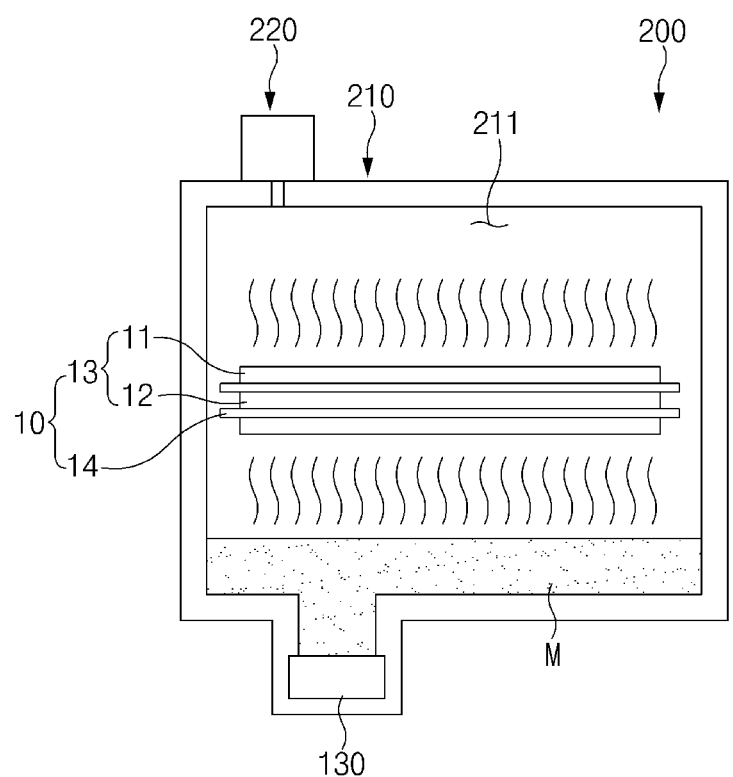
FIG. 4 is a cross-sectional view illustrating an apparatus and method for manufacturing an electrode assembly according to another embodiment of the present invention.

FIG. 4 is a cross-sectional view illustrating an apparatus and method for manufacturing an electrode assembly according to another embodiment of the present invention.

Referring to FIG. 4, a method for manufacturing an electrode assembly according to another embodiment of the present invention comprises a melting induction process of inducing melting on outer surfaces of separators 14 and a lamination process of alternately combining and laminating electrodes and the separators 14. Here, the melting induction process may comprise a vaporization process of vaporizing a melting induction solvent M.

When the method for manufacturing the electrode assembly according to another embodiment of the present invention is compared to the method for manufacturing the electrode assembly according to the foregoing embodiment of the present invention, a vacuum process of allowing the inside of a chamber 210 to be in a vacuum state may be further performed.

Thus, contents of this embodiment, which are duplicated with those according to the forgoing embodiment, will be briefly described, and also, differences therebetween will be mainly described.

The method for manufacturing the electrode assembly according to another embodiment of the present invention may further comprise a vacuum process of allowing an accommodation part 211 of a chamber 210 to be in a vacuum state prior to the vaporization process in the melting induction process. Thus, pressure within the chamber 210 may be reduced to enhance vaporization of the melting induction solvent M.

In the vacuum process, for example, the accommodation part 211 of the chamber 210 may become the vacuum state by a vacuum part 220. Here, the vacuum part 220 may comprise, for example, a vacuum pump.

In addition, the chamber 210 may be formed in the form of a sealing-type chamber so that the vacuum of the accommodation part 211 is easily established by the vacuum part. Here, the chamber 210 may be provided as a sealing-type chamber.

Furthermore, the accommodation part 211 of the chamber 210 may be, for example, maintained at an atmospheric pressure or less. Here, the accommodation part 211 of the chamber 210 may be, for example, maintained at a pressure of −99 KPa to −80 KPa. Here, the accommodation part 211 of the chamber 210 may be, for more specific example, maintained at a pressure of −93 KPa to −80 KPa.

Hereinafter, the apparatus for manufacturing the electrode assembly according to an embodiment of the present invention will be described in more detail with reference to FIG. 1.

Referring to FIG. 1, an apparatus 100 for manufacturing the electrode assembly according to an embodiment of the present invention comprises a chamber 110 that accommodates an electrode 10 and a melting induction solvent M and a heater 130 for vaporizing the melting induction solvent M.

In addition, the apparatus 100 for manufacturing the electrode assembly according to an embodiment of the present invention may further comprise a lamination part 120 and a vacuum hood 140.

The chamber 110 comprises an accommodation part 111 to accommodate the electrode assembly 10 and the melting induction solvent M.

In the electrode assembly 10, an electrode 13 and a separator 14 are alternatively disposed. The melting induction solvent M may induce melting on an outer surface of the separator 14 to increase an adhesion force of an interface between the electrode 13 and the separator 14.

Here, each of the electrodes 13 comprises a positive electrode 11 and a negative electrode 12. Here, the positive electrode 11, the separator 14, and the negative electrode 12 may be alternately disposed.

The separator 14 is made of an insulation material to electrically insulate the positive electrode 11 from the negative electrode 12.

Further, the separator 14 may comprise a base material 14a and a melting layer 14b formed on an outer surface of the base material 14a. Here, the melting layer 14b may comprise an organic material. The organic material may be melted by the melting induction solvent M. In particular, the melting induction solvent M may not melt the base material 14a but melt only the organic material of the melting layer 14b to soften the melting layer.

For example, the base material 14a may be made of a polyolefin-based resin film such as polyethylene or polypropylene having micropores. Here, the base material 14a is resinized as a high molecular polymer and is not melted in the melting induction solvent M. The base material 14a may be formed in the form of a film.

The melting layer 14b may comprise an inorganic material and an organic material. Here, the organic material may comprise a binder and a dispersing agent. Each of the binder and the dispersing agent may comprise a monomolecular organic material and be melted in the melting induction solvent M.

The melting induction solvent M may comprise a solvent having affinity for the organic material of the melting layer 14b. Here, a di-methyl carbonate (DMC) solvent may be used as the melting induction solvent M.

The heater 130 may apply heat to the melting induction solvent M accommodated in the accommodation part 111 of the chamber 110 to vaporize the melting induction solvent M, thereby forming a space which is humidified by vapor, in the accommodation part 111 of the chamber 110. Thus, the uniform melting may be induced on the outer surface of the separator 14 disposed in the space, which is humidified by the vapor, to achieve the uniform adhesion between the electrode 13 and the separator 14.

Also, the heater 130 may comprise, for example, a heater case and a coil wound within the heater case to heat the melting induction solvent M using resistive heating of the coil.

The lamination part 120 may press the separator 14 on which the melting is induced on the outer surface thereof and the electrode 13 to alternately combine and laminate the electrode 13 and the separator 14. Here, the lamination part 120 may comprise a pair of rolls 121 and 122. The electrode 13 and the separator 14 may pass between the pair of rolls 121 and 122 and then be pressed and laminated.

The vacuum hood 140 may be disposed on each of both sides of the chamber 110 in a traveling direction of the electrode 13 and the separator 14, which pass through the accommodation part 11 of the chamber 110. Here, an outlet and an inlet, through which the electrode 13 and the separator 14 pass, may be provided in both sides of the chamber 110, respectively. In addition, the vacuum hood 140 may suction the melting induction solvent M that leaks through the outlet and the inlet of the chamber 110. As a result, when the electrode 13 and the separator 14 pass through the accommodation part 11 of the chamber 110, the melting induction solvent M may not leak to the outside of the chamber 110. Further, the vaporized melting induction solvent M introduced through the vacuum hood 140 may be liquefied again to be reused.

Hereinafter, an apparatus for manufacturing an electrode assembly according to another embodiment of the present invention will be described in more detail with reference to FIG. 4.

Referring to FIG. 4, an apparatus 200 for manufacturing the electrode assembly according to another embodiment of the present invention comprises a chamber 210 that accommodates an electrode assembly 10 and a melting induction solvent M and a heater 130 for vaporizing the melting induction solvent M.

When the apparatus 200 for manufacturing the electrode assembly according to another embodiment of the present invention is compared to the apparatus 100 for manufacturing the electrode assembly according to the foregoing embodiment of the present invention, this embodiment is different from the foregoing embodiment in that a vacuum part 220 for allowing the inside of a chamber 210 to be in a vacuum state is further provided.

The vacuum part 220 may be connected to the accommodation part 211 of the chamber 210 to allow the accommodation part 211 of the chamber 210 to be in a vacuum state. Here, the chamber 210 may be provided as a sealing-type chamber so that the vacuum of the accommodation part 211 is easily established through the vacuum part 220. The vacuum part 220 may comprise, for example, a vacuum pump.

While the present invention has been particularly shown and described with reference to exemplary embodiments thereof, it is to be understood that the scope of the present invention is not limited to the apparatus and method for the electrode assembly according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A method for manufacturing an electrode assembly, the method comprising:
 a melting induction process of inducing melting on an outer surface of each of separators by a melting induction solvent to increase an adhesion force of an interface between each of electrodes and the separators; and
 a lamination process of alternately combining and laminating the electrodes and the separators,
 wherein the melting induction process comprises a vaporization process of vaporizing the melting induction solvent to form a space that is humidified by vapor,
 wherein the electrodes and the separators are disposed in the space that is humidified by, the vapor to induce a uniform melting on the outer surface of the separators,
 wherein in the lamination process, the electrodes and the separators are pressed while passing between a pair of rolls to combine and laminate the electrodes and the separators,
 wherein the pair of rolls have a temperature maintained at less than 100° C.,
 wherein the separators include a base material and a melting layer comprising an organic material formed on an outer surface of the base material, and in the melting induction process, the melting layer is melted by the melting induction solvent to soften the melting layer,
 wherein the melting layer further comprises an inorganic material, and the organic material comprises a binder and a dispersing agent,
 wherein the melting layer comprises 80 wt % to 90 wt % of the inorganic material, 9 wt % to 18 wt % of the binder, and 1 wt % to 2 wt % of the dispersing agent,
 wherein the base material comprises a resin film made of a high molecular polymer, and each of the binder and the dispersing agent is made of a monomolecular organic material,
 wherein the inorganic material includes aluminum oxide,
 wherein the binder includes a polyvinylidene fluoride (PVdF) polymer, and
 wherein the dispersing agent includes cyanoethyl polyvinyl (PVA) alcohol.

2. The method of claim 1, wherein, in the melting induction process, the space that is humidified by the vapor is formed in an accommodation part formed in a chamber, and the electrodes and the separators are disposed in the accommodation part of the chamber to induce the melting on the separators.

3. The method of claim 2, wherein, in the vaporization process, the melting induction solvent is accommodated in the accommodation part of the chamber and heated by a heater to be vaporized.

4. The method of claim 2, wherein the melting induction process further comprises a vacuum process of allowing the accommodation part of the chamber to be in a vacuum state prior to the vaporization process.

5. The method of claim 2, wherein the lamination process is performed in the accommodation part of the chamber.

6. The method of claim 1, wherein, in the melting induction process, a di-methyl carbonate (DMC) solvent is used as the melting induction solvent to induce the melting of the organic material contained in the melting layer of the separators.

7. The method of claim 6, wherein, in the vaporization process, the DMC solvent is heated at a temperature of 80° C. to 90° C. and vaporized.

8. The method of claim 6, wherein, in the melting induction process, the outer surface of the separators is melted while the electrodes and the separators pass through an accommodation part of a chamber, and
 a vacuum hood is disposed on each of both sides of the chamber in a traveling direction of the electrodes and the separators to allow the DMC solvent that leaks to the outside of the chamber to be suctioned into the vacuum hood.

9. The method of claim 1, wherein the temperature is maintained at 45° C. to 90° C.

10. An apparatus for manufacturing an electrode assembly, the apparatus comprising:
 a chamber comprising an accommodation part that accommodates an electrode assembly, in which electrodes and separators are alternately disposed, and a melting induction solvent that induces melting on an outer surface of each of the separators to increase an adhesion force of an interface between each of the electrodes and the separators;

a heater that vaporizes the melting induction solvent accommodated in the chamber to induce uniform melting on the outer surface of the separators disposed in the accommodation part of the chamber; and a lamination part that presses the separators on which the melting is induced on the outer surface and the electrodes after being alternately combined to laminate the separators and the electrodes, wherein the lamination part comprises a pair of rolls, and the electrodes and the separators are pressed while passing between the pair of rolls, and wherein the pair of rolls have a temperature maintained at less than 100° C., wherein the separators include a base material and a melting layer comprising an organic material formed on an outer surface of the base material, and in the melting induction process, the melting layer is melted by the melting induction solvent to soften the melting layer, wherein the melting layer further comprises an inorganic material, and the organic material comprises a binder and a dispersing agent, wherein the melting layer comprises 80 wt % to 90 wt % of the inorganic material, 9 wt % to 18 wt % of the binder, and 1 wt % to 2 wt % of the dispersing agent, wherein the base material comprises a resin film made of a high molecular polymer, and each of the binder and the dispersing agent is made of a monomolecular organic material, wherein the inorganic material includes aluminum oxide, wherein the binder includes a polyvinylidene fluoride (PVdF) polymer, and wherein the dispersing agent includes cyanoethyl polyvinyl (PVA) alcohol.

11. The apparatus of claim 10, further comprising a vacuum part connected to the accommodation part of the chamber, and the chamber is provided as a sealing-type chamber to allow the accommodation part of the chamber to become a vacuum state by the vacuum part.

12. The apparatus of claim 10, further comprising a vacuum hood disposed on each of both sides of the chamber in a traveling direction of the electrodes and the separators to suction the melting induction solvent to prevent the melting induction solvent from leaking to the outside of the chamber when the electrodes and the separators pass through the accommodation part of the chamber.

13. The apparatus of claim 10, wherein the temperature is maintained at 45° C. to 90° C.

* * * * *